United States Patent
Stoess et al.

(12) 
(10) Patent No.: US 6,625,697 B1
(45) Date of Patent: Sep. 23, 2003

(54) CACHE-STORAGE DEVICE WITH A BUFFER STORING PREFETCH DATA

(75) Inventors: Annie Stoess, Bad Aibling (DE); Johann Schachtner, Putzbrunn (DE); Wolfgang Ziemann, Hoehenkirchen-Siegertsbrunn (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/831,900

(22) PCT Filed: Nov. 24, 1999

(86) PCT No.: PCT/DE99/03730

§ 371 (c)(1), (2), (4) Date: Jun. 14, 2001

(87) PCT Pub. No.: WO00/31642

PCT Pub. Date: Jul. 2, 2000

(30) Foreign Application Priority Data

Nov. 25, 1998 (DE) .......................... 198 54 505

(51) Int. Cl.⁷ .............................................. G06F 13/00
(52) U.S. Cl. ............................................... 711/137
(58) Field of Search ................... 711/137, 138, 711/133

(56) References Cited

U.S. PATENT DOCUMENTS

| | | | | |
|---|---|---|---|---|
| 5,345,560 A | | 9/1994 | Miura et al. ............. | 711/3 |
| 5,404,484 A | * | 4/1995 | Schlansker et al. ...... | 711/133 |
| 5,499,355 A | * | 3/1996 | Krishnamohan et al. .. | 711/137 |
| 5,619,663 A | * | 4/1997 | Mizrahi-Shalom et al. | 711/137 |
| 5,778,435 A | * | 7/1998 | Berenbaum et al. ..... | 711/137 |
| 5,822,757 A | * | 10/1998 | Chi ........................ | 711/137 |
| 5,958,040 A | * | 9/1999 | Jouppi .................... | 711/137 |
| 6,134,643 A | * | 10/2000 | Kedem et al. ........... | 711/213 |

FOREIGN PATENT DOCUMENTS

| DE | 43 30 751 | 3/1974 |
|---|---|---|
| EP | 0 762 288 | 3/1997 |

OTHER PUBLICATIONS

IBM Technical Disclosure Bulletin, vol. 36, No. 06B, pp. 451–452, "Prefetching from the L2", Jun. 1, 1993.
IBM Technical Disclosure Bulletin, vol. 36, No. 12, pp. 311–312, "Use of Small L2 as a Prefetch Buffer", Dec. 1, 1993.

* cited by examiner

Primary Examiner—Glenn Gossage
(74) Attorney, Agent, or Firm—Oblon, Spivak, McClelland, Maier & Neustadt, P.C.

(57) ABSTRACT

A cache memory device to increase the power of a processor system that operates with a cache memory device and with look-ahead read cycles for making available information bits needed by the processor system. The cache memory device automatically executes additional look-ahead read cycles and makes the additional information bits determined in this way available, in addition to the information bits obtained from read cycles in response to the processor system. The cache memory device may include an independent storage component or buffer for temporary storage of the additional bits.

8 Claims, 2 Drawing Sheets

CACHE-STORAGE DEVICE WITH A BUFFER STORING PREFETCH DATA

CROSS-REFERENCE TO RELATED APPLICATIONS

The present application claims the benefit of the earlier filing date of PCT application PCT/DE99/03730 filed Nov. 24, 1999, which claims priority from German application 19854 505.3 filed Nov. 25, 1998.

BACKGROUND OF THE INVENTION

1. Field of the Invention

The present invention relates to a cache memory device having an "intelligent prefetching" functionality.

The invention relates to a cache memory device according to the preamble of claim 1.

2. Discussion of the Background

Modem standard processors, such as those manufactured by Intel®, which may have one or more internal and/or external cache memory devices, usually permit only the design of processor systems with up to four individual processors. These individual processors are connected via a common system bus to one or more primary storage components, which function as main memory. The individual processors are also connected to an input/output system. Such a system represents a relatively small processor system. Large processor systems, however, which are needed for large servers, for example, must contain many more than four individual processors. The large number of processors ensures that such a system will be very powerful.

To construct large servers having a large processor system, such as a processor system containing 16, 32, 64, or 128 processors, additional cache memory devices can be provided, each having connections for 4 processors. If a plurality of such additional cache memory devices, each with 4 connected processors, are coherently coupled with one another, an extremely powerful processor system is achieved.

If the individual processors already have internal and/or external cache memory devices, for example, an on-chip level 1 cache memory device and an off-chip level 2 cache memory device, the additional cache memory device would in this case be a so-called level 3 cache memory device, with which the large processor system would be achieved.

From European Patent 0762288 A2 there is known a cache memory device for one or more processors. These are processor systems provided with one or more cache memory devices and one or more primary storage components, providing information bits needed for execution of processes are made available from the one or more primary storage components by the one or more cache memory devices. The information bits are made available from the one or more primary storage components in response to the one or more processors at least in part as the results of look-ahead read cycles (prefetching) associated with limited look-ahead regions. The cache memory device (ECS) has a functionality according to which the cache memory device (ECS), during respective read cycles in response to the one or more processors against the background of look-ahead regions which are limited in each case, controls look-ahead read cycles beyond the limited look-ahead regions of the read cycles in response to the one or more processors. The information bits additionally determined in this way are made available for at least a limited time besides those information bits obtained from read cycles in response to the one or more processors.

SUMMARY OF THE INVENTION

The object of the present invention, based on processor systems of the type discussed above, is to provide technical improvements by which the power of such processor systems is further increased.

This object is achieved by providing a cache memory device having the features described below.

Accordingly, by comparison with conventional cache memory devices, the inventive cache memory device additionally has a functionality that can also be described concisely as "intelligent prefetching". If such a cache memory device is used in large processor systems, for example as a level 3 cache memory device, the power of the entire processor system can be decisively increased.

The prefetching method is indeed known for processors, but not for cache memory devices. According to the prefetching method, the processors, for the purpose of execution of processes, not only fetch currently needed information bits, which may be data and/or code information bits but, by looking ahead, they also fetch information bits that have greater probability of being needed next in an execution process. Code information bits are information bits that relate to an executive program. Data information bits are information bits with which an executive program performs its work.

Prefetch accesses are hunch or speculative accesses. They are speculative because the processors will not necessarily have to access, as the next data or codes, those read by looking ahead. The accesses are dependent on the program processing, which controls a process to be executed currently. For example, jump instructions in the process to be executed are unstable points, which may cause information bits entirely different from those which have been read by looking ahead to become suddenly important. Nevertheless, whenever the information bits read by looking ahead are used, prefetching results in a performance increase of the overall system.

Ultimately, prefetch accesses are accesses to so-called information blocks in main memory. All information bits stored in main memory are stored in the form of such information blocks. Logically associated information blocks are then stored sequentially as far as possible. Thereby it can be assumed with relatively good success that, after a needed information block, the information block stored as the next neighbor of that information block in main memory will be the next to be needed. If at least this information block is already available in advance in a cache memory device, it can be used immediately if needed, thus obviating a time-consuming read process for this information block. In this way latency times are shortened.

The look-ahead read cycles in response to a request from a processor are confined to a limited look-ahead region. The inventive cache memory device offers the possibility of actively looking ahead beyond this limited region. This means that information bits which, up to a predetermined distance, are stored as next neighbors of the information bits fetched in response to the processor system, are made available as additional information bits. They comprise at least those information bits that are stored in working memory as immediate next neighbors of the information bits made available in response to a processor request, although they can also comprise information bits that are stored further therefrom. By application of appropriate strategies, those information bits can be stored not merely at sequentially ordered sites, but also at distributed sites. In this way even more information bits read by looking ahead are available to the processors, thus increasing the hit rate of read accesses of the processors. At the same time, the load on the processors is not further increased, since the execution of additional read cycles controls the cache memory device in a corresponding manner.

According to another aspect of the present invention, the inventive cache memory device, before making new information bits available, checks whether the information bits are already available in the cache memory device.

To prevent information bits additionally made available by the cache memory device from overwriting information bits already made available in the cache memory device and possibly needed with higher probability, the cache memory device is provided with its own special storage component for the information bits additionally made available. In this special storage component, the information bits additionally made available are temporarily stored optionally for a limited or unlimited time, until they are overwritten by new information bits additionally made available, or are read out for use in response to a processor request that has since been received. In the case of a time limitation, they can also be kept in temporary storage until either they are completely transferred into the cache memory device or are deleted once again.

On the whole, it is ensured with the inventive cache memory device that access times to working memory are greatly reduced for accesses to data and/or code information.

BRIEF DESCRIPTION OF THE DRAWINGS

A practical example of the invention will be explained in more detail hereinafter on the basis of the following drawings, wherein.

DESCRIPTION OF THE PREFERRED EMBODIMENTS

Figure 1:
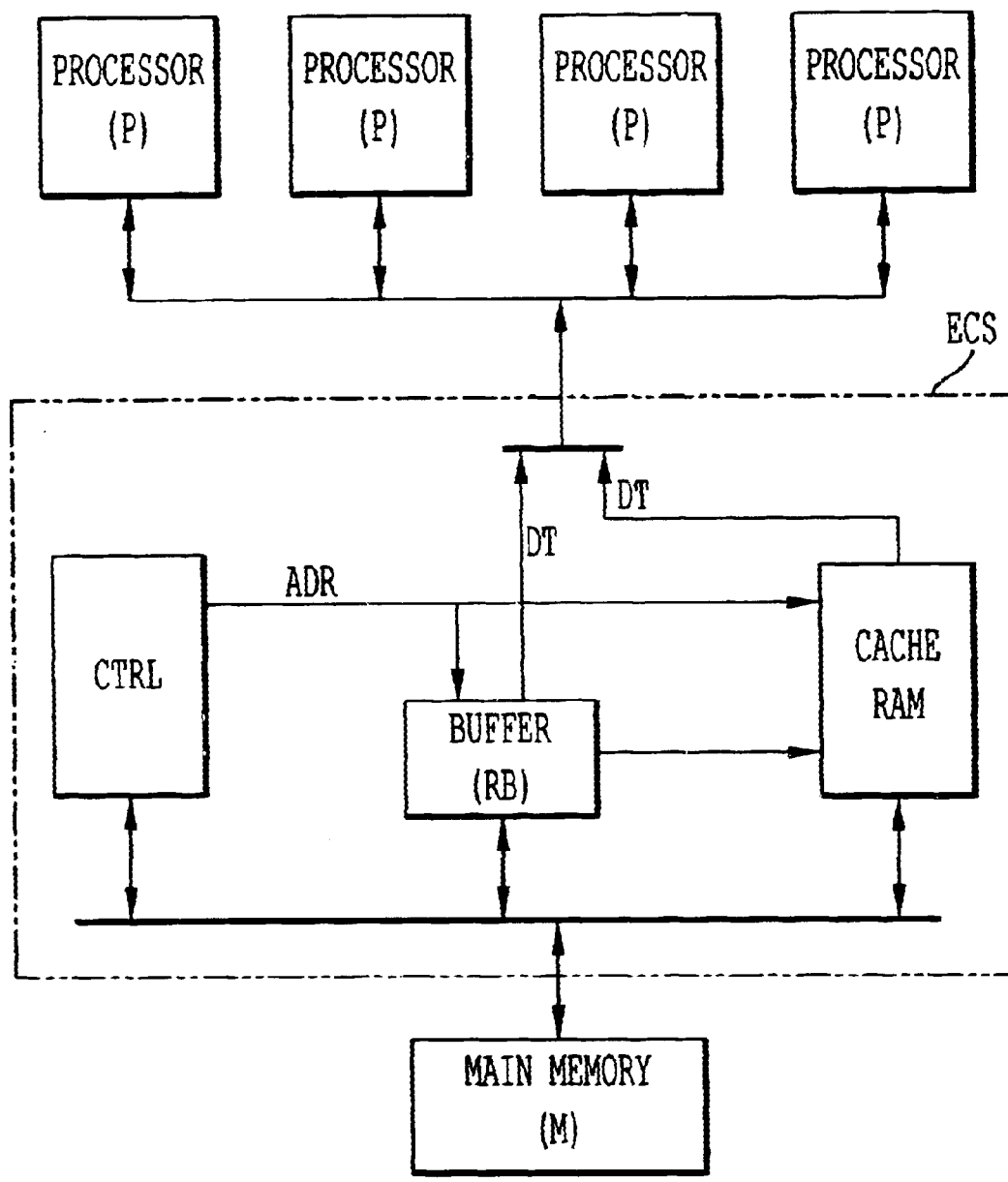
FIG. 1 shows a basic architecture of a known processor system, which can be expanded by duplication and appropriate interconnection, with a cache memory device for connection of four processors.

FIG. 1 shows a processor system with an inventive cache memory device ECS, to which four processors P are connected. Cache memory device ECS is a linking element between the four processors P and main memory M. Main memory M is shown as a unit in FIG. 1. It can also comprise, however, a plurality of individual primary storage components.

To form a large processor system, there can be provided a plurality of such cache memory devices ECS, each with four processors P, which are connected to main memory M via an appropriately designed bus.

According to the practical example, a control device CTRL, a cache (random access) memory component RAM and a temporary storage buffer RB are shown as components inside cache memory device ECS. Control device CTRL is connected via line circuits ADR to cache memory component RAM and temporary storage buffer RB. There are also shown line circuits DT, which extend from temporary storage buffer RB on the one hand, and from cache memory component RAM on the other hand to an external bus. Processors P are also connected to this external bus. Control device CTRL, temporary storage buffer RB, and cache memory component RAM are additionally connected via a common internal bus, which, in the practical example, is also the bus to which main memory M is connected.

In one embodiment, control device CTRL controls cache memory device ECS in a conventional manner. For example, if data are requested from main memory M by a processor P, the data flow is directed from main memory M into temporary storage buffer RB and/or into cache memory component RAM. For this purpose, appropriate address control takes place via line circuits ADR. If the data are needed immediately, relaying of the data from temporary storage buffer RB to the requesting processor P takes place via line circuits DT. If the data are not needed immediately, the data remain in temporary storage buffer RB until they are either overwritten or swapped out. If the information bits are needed at a later time and if, for example, they have already been swapped out into cache memory component RAM, they are relayed to the requesting processor P via the line circuits DT connected to cache memory component RAM.

In addition to the control described above, cache memory device ECS is provided according to an additional functionality with a further control capability. In addition to the information bits being made available from main memory M in response to requests from the one or more processors P, the cache memory device ECS in each case automatically makes available from main memory M those information bits which, up to a predetermined distance, are at that time stored in main memory M as neighbors of the information bits made available from main memory M in response to requests from the one or more processors P.

Figure 2:
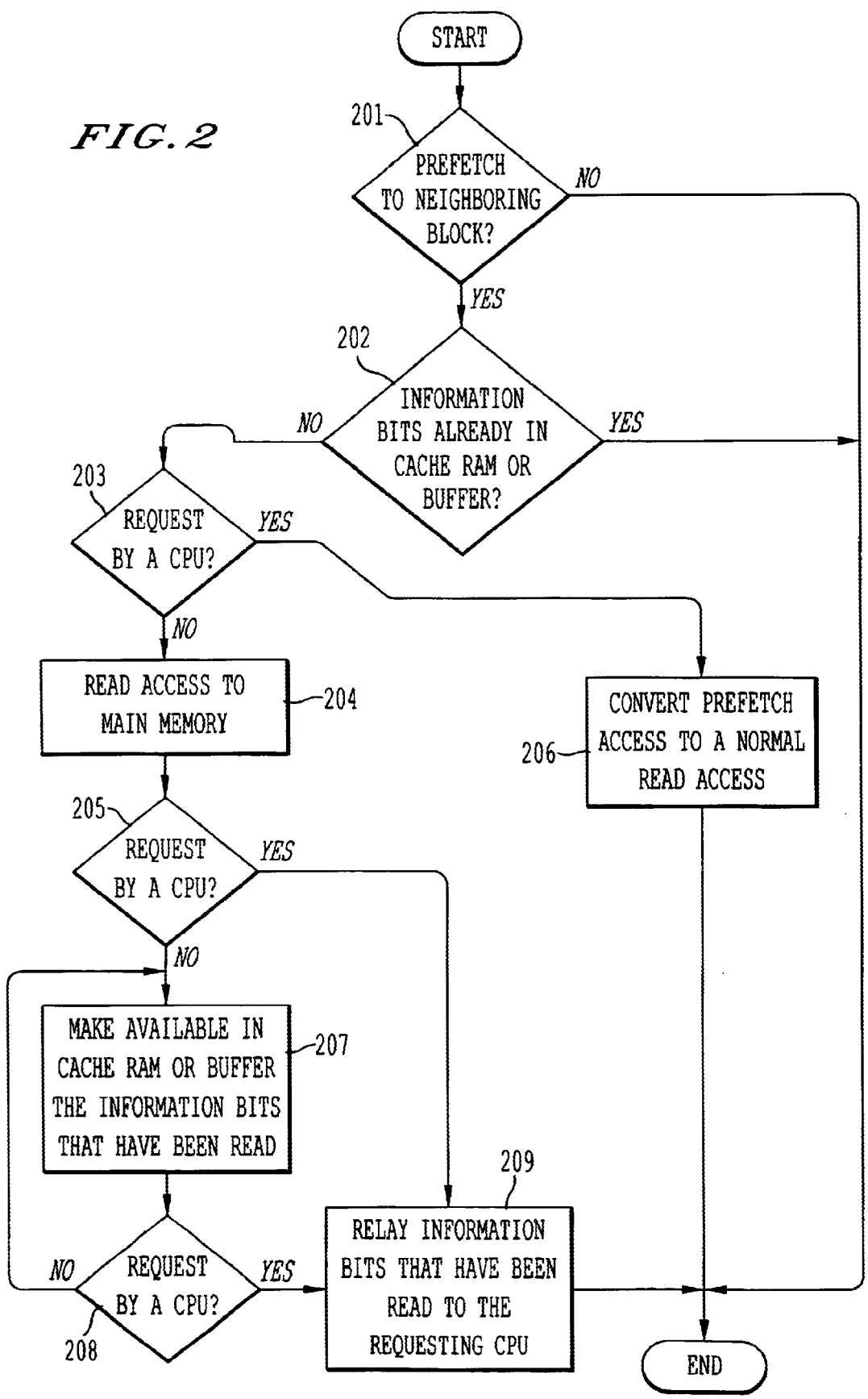
FIG. 2 shows a block flow diagram of an inventive additional functionality for a cache memory device according to FIG. 1.

Substantially the following steps in principle are executed, as graphically summarized in the form of a flow diagram in FIG. 2:

In step 201, control device CTRL decides during access to an information block, abbreviated merely as "block" hereinafter, whether a prefetch will be executed on a neighboring block. If a prefetch is not to be executed, the process terminates. If a prefetch is to be executed, an inquiry is made in step 202 whether the information bits obtained are already stored in cache memory component RAM or in temporary storage buffer RB. If this is the case, no further actions are executed. If the information bits are not yet in cache memory component RAM or in temporary storage buffer RB, an inquiry is made in step 203 as to whether the information bits have been requested by a processor. If so, the "prefetch" access is converted into a normal read access in step 206, and the process terminates. Otherwise, a so-called cache MISS has occurred and a read access to main memory M is started in step 204. After arrival of the information bits, these information bits are relayed to a processor P in step 209 if the inquiry of step 205 indicates that a specific request is present. If the results of step 205 indicate that the bits have not been requested, depending on a selected mode of operation, these information bits remain in cache memory component RAM or in temporary storage buffer RB in step 207. If, during look-ahead reading of information bits, the information bits are needed by a processor P, as indicated by the inquiry in step 208, they are immediately relayed to the requesting processor P, as is normal in a HIT case. In this case, the associated processor request is converted by control device CTRL into a normal read access.

A mode of operation in which the prefetch information bits are entered not in cache memory component RAM but only in temporary storage buffer RB, in general in a temporary read buffer, has the following advantage:

If the prefetch information bits are entered into cache memory component RAM, an existing entry in cache memory component RAM is usually displaced thereby. If the prefetch information bits are then not needed later, the hit rate in cache memory component RAM possibly may be reduced. In contrast, if the prefetch information bits remain in a temporary read memory, the above effect cannot occur. By the fact that the number of read buffers is limited, these information bits will indeed be displaced earlier once again. This effect is not particularly great, however, since according to the invention, prefetch information bits are needed very soon or not at all.

When it is possible to choose between these two modes of operation, the more favorable mode can be selected during operation.

What is claimed is:

1. A cache memory device for a processor system provided with at least one processor, at least one primary cache memory device, and at least one primary storage component, comprising:

an independent storage component;

a cache memory unit connected to the at least one processor and to the at least one primary storage component; and a control device configured to provide information bits from the at least one primary storage component to the at least one processor for execution of respective processes, the information bits being made available from the at least one primary storage component in response to a request from the at least one processor at least in part as a result of look-ahead read cycles (prefetching) associated with a limited look-ahead region, wherein the cache memory device, during respective read cycles in response to the request from the at least one processor having the limited look-ahead region, controls look-ahead read cycles beyond the limited look-ahead region, and makes additional information bits available for at least a limited time, in addition to the information bits obtained from the read cycles performed in response to the request from the at least one processor; and the additional information bits are made selectively available (1) for a limited time in the independent storage component, or (2) for an indeterminable time in the cache memory unit until overwritten by new information bits.

2. A cache memory device according to claim 1, wherein the information bits are data and/or code information bits.

3. A cache memory device according to claim 1, wherein the cache memory device makes the additional information bits available only if the additional information bits have not already been made available.

4. A cache memory device according to claim 3, wherein the information bits are data and/or code information bits.

5. A cache memory device according to claim 1, wherein the control device identifies the additional information bits from the at least one primary storage component that, up to a predetermined distance, are stored in the at least one primary storage component as neighbors of the information bits made available from the at least one primary storage component in response to the request from the at least one processor.

6. A cache memory device according to claim 5, wherein the information bits are data and/or code information bits.

7. A cache memory device according to claim 5, wherein the cache memory device makes additional information bits available only if the additional information bits have not already been made available.

8. A cache memory device according to claim 7, wherein the information bits are data and/or code information bits.

* * * * *